(12) United States Patent
Takamatsu

(10) Patent No.: US 6,619,649 B2
(45) Date of Patent: Sep. 16, 2003

(54) AUTOMATIC SHEET FEEDER

(75) Inventor: Naritoshi Takamatsu, Nara (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 10/278,538

(22) Filed: Oct. 23, 2002

(65) Prior Publication Data

US 2003/0047860 A1 Mar. 13, 2003

Related U.S. Application Data

(62) Division of application No. 09/790,965, filed on Feb. 22, 2001.

(30) Foreign Application Priority Data

Feb. 24, 2000 (JP) .......................................... 2000-47713

(51) Int. Cl.[7] ................................................ B65H 5/06
(52) U.S. Cl. ...................... 271/3.14; 371/3.2; 371/3.18; 358/498; 399/380
(58) Field of Search .............................. 271/3.14, 3.18, 271/3.2; 358/498; 399/379, 380

(56) References Cited

U.S. PATENT DOCUMENTS

| | | | | |
|---|---|---|---|---|
| 4,977,828 A | * | 12/1990 | Douglas | 101/142 |
| 5,370,379 A | * | 12/1994 | Wyer | 271/3.03 |
| 5,421,569 A | * | 6/1995 | Davidson | 271/109 |
| 5,680,203 A | * | 10/1997 | Kobayashi et al. | 355/76 |
| 5,709,380 A | * | 1/1998 | Petocchi et al. | 271/125 |
| 5,842,692 A | * | 12/1998 | Rutishauser | 271/3.2 |
| 5,921,539 A | * | 7/1999 | Westcott et al. | 271/10.03 |
| 5,986,775 A | * | 11/1999 | Yoshimizu | 358/496 |

FOREIGN PATENT DOCUMENTS

JP          09-188434          7/1997

* cited by examiner

Primary Examiner—Christopher P. Ellis
Assistant Examiner—Mark A. Deuble
(74) Attorney, Agent, or Firm—Hogan & Hartson, LLP

(57) ABSTRACT

An automatic document feeder (ADF) used in a facsimile machine, photocopier or the like. A sheet path from a sheet inlet to outlet is defined by lower, intermediate and upper frames of the ADF. The sheet path is generally shaped like "C" when viewed laterally. The intermediate frame has a pivotable member that can be opened and closed, and a guide member for guiding a sheet passing over a platen glass. An elastic member is provided for biasing the guide member on the platen surface from a turning portion of the C-shaped sheet path. Therefore, it is possible to maintain a clearance between the platen surface and guide member and prevent the sheet from flapping. A retard roller is removably supported by the pivotable member so that replacing and maintenance of the retard roller is simplified. Further, the pivotable member is a one-piece element and made from resin. A plurality of ribs extending in a sheet feed direction are provided near the sheet inlet and/or outlet so that the weight of the automatic document feeder is reduced and movements of the sheets are facilitated.

2 Claims, 12 Drawing Sheets

AUTOMATIC SHEET FEEDER

This is a divisional of application Ser. No. 09/790,965 filed Feb. 22, 2001, which application is hereby incorporated by reference in its entirety.

CROSS REFERENCES TO RELATED APPLICATIONS

This application claims priority under 35 USC 119 of Japanese Patent Application No. 2000-47713 filed on Feb. 24, 2000, the entire disclosure of which is incorporated herein by reference.

BACKGROUND OF THE INVENTION

1. Field of the Invention

The present invention relates to an automatic sheet feed/transfer apparatus having a generally C-shaped, when viewed laterally, sheet path. This automatic sheet feed/transfer apparatus is applicable to, for example, a photocopier, a facsimile machine and an image forming apparatus having a copy function and a facsimile function in order to feed sheets for scanning.

2. Description of the Related Art

An automatic document feeder (ADF) is known in the art, which is incorporated in a photocopier, a facsimile machine or an image forming apparatus having copy and facsimile functions, to feed a document or sheets to a scanner. Usually, a sheet path, which is generally shaped like "C" (or turned "U") when viewed laterally, extends in the machine from a sheet feeder to a sheet discharge tray. A plurality of sheet feed rollers are located at appropriate positions along the sheet path. A retard roller is provided to separately feed the sheets one piece at a time and successively. A platen surface or plate is usually located downstream of the turning point of the C-shaped sheet path for the scanning of the sheets. A relatively large sheet feed roller is positioned in the vicinity of the platen plate. The upstream half of the sheet path extends over the downstream half.

The upstream half of the sheet path is defined by an upper frame of the machine and an upper portion of an intermediate frame. The intermediate frame is pivotable. The downstream half of the sheet path is defined by a lower frame of the machine and a lower portion of the intermediate frame. A guide member facing the platen surface is also provided.

The large feed roller near the platen surface is in press-contact with associated front and rear rollers (i.e., press rollers) to guide the sheets appropriately. However, the sheet path downstream of the plate surface has a steep angle so that the sheet feeding does not take place smoothly. This often results in distortion of the scanned image.

Further, if the guide member is fixedly attached to a platen cover (plate for pressing the sheet), a clearance between the platen surface and guide member cannot be maintained to constant due to assembling errors and/or other reasons. As a result, the clearance becomes too large, and therefore the sheet "flaps" during the scanning. This degrades quality of the scanned image.

Moreover, roller drives are located along one side of the sheet path so that a stress is concentrated on one side of the retard roller. This causes the sheet to proceed diagonally.

SUMMARY OF THE INVENTION

An object of the present invention is to solve the above described problems of the conventional arrangement.

Another object of the present invention is to facilitate replacing/maintenance of a retard roller.

According to a first aspect of the present invention, there is provided an automatic sheet feeding apparatus including lower, intermediate and upper frames to define a sheet path extending from a sheet inlet to a sheet outlet. The sheet path is generally shaped like "C" when viewed laterally. The intermediate frame has a pivotable member which can be opened and closed, and a guide member for guiding a sheet passing over a platen surface. The automatic sheet feeding apparatus also includes an elastic member for biasing the guide member on the platen surface from a turning portion of the generally C-shaped sheet path. Therefore, it is possible to maintain a clearance between the platen surface and guide member and prevent the sheet from flapping.

The guide member may be pivotable about a feed roller shaft located upstream of the platen surface with respect to a sheet feeding direction in the apparatus.

According to a second aspect of the present invention, there is provided an automatic sheet feeding apparatus including a generally C-shaped sheet path extending from a sheet inlet to a sheet outlet, a platen surface located downstream of a turning portion of the C-shaped sheet path, a first guide member for guiding a sheet from the sheet inlet to the turning portion of the C-shaped sheet path, a second guide member for guiding the sheet from the turning portion of the C-shaped sheet path to the platen surface, a third guide member for guiding the sheet from the platen surface to the sheet outlet, and drive rollers for feeding the sheet along the sheet path. The drive rollers are rotatably supported by the first, second and third guide members respectively, and at least the first guide member is pivotable about a shaft of the roller which is supported by the first guide roller.

According to a third aspect of the present invention, there is provided an automatic sheet feed apparatus including a generally C-shaped sheet path defined by lower, intermediate and upper frames. The intermediate frame has a pivotable member that can be opened and closed and a guide member for guiding a sheet passing over a platen surface. The pivotable member has a recess to receive a retard roller, which is generally in contact with a separate roller. Since the pivotable member can be opened and closed and the retard roller is removably supported by the pivotable member, replacement and maintenance of the retard roller can be done easily. An elastic member is also located in the recess for exerting an adjustable biasing force directed in a first direction other than a second direction in which the retard roller presses the separate roller. A direction change member is provided for receiving the biasing force from the elastic member in the first direction and transferring the biasing force to the retard roller in the second direction.

The direction change member may have an L shape when viewed laterally, and may be pivotable about the angled point of the L such that the biasing force acts on the vertical portion of the L in the first direction and the retard roller is biased by the horizontal portion of the L in the second direction substantially perpendicular to the first direction. The direction change member may have a through hole in the vertical portion of the L such that a user can access the elastic member to adjust elasticity of the elastic member.

The automatic sheet feed apparatus may further include a drive mechanism located in the recess, and a removable cover extending over the recess for closing the recess and defining part of the sheet path. The automatic sheet feed apparatus may further include at least one first rib for guiding the retard roller in the second direction, and at least one second rib that is integral with the at least one first rib for supporting the direction change member. Both the first and second ribs are positioned in the recess. The automatic sheet feed apparatus may further include a first arm pivotable up and down about one end thereof in the recess for supporting a drive mechanism for the retard roller, and a second arm removably supported at the other end of the first arm opposite for supporting the retard roller such that the second arm can pivot up and down about the other end of the first arm together with the retard roller. The automatic sheet feed apparatus may further include an intermediate shaft supported by the first arm such that the intermediate shaft extends generally perpendicular to a moving direction of the sheet in the sheet path when viewed from the top. Parts of the drive mechanism upstream of the intermediate shaft may be supported by the first arm on one lateral side of the sheet path, and remaining parts of the drive mechanism located downstream of the intermediate shaft until the retard roller may be supported by the first and second arms on the opposite lateral side of the sheet path.

According to a fourth aspect of the present invention, there is provided an automatic sheet feed apparatus including a generally C-shaped sheet path extending from a sheet inlet to a sheet outlet and defined by lower, intermediate and upper flames. The intermediate frame has a pivotable member that can be opened and closed, and a guide member for guiding a sheet passing over a platen surface. The apparatus also includes a sheet discharge roller unit located at the sheet outlet and having a drive roller supported by the lower frame and a driven roller supported by the pivotable member such that the driven roller faces the drive roller and a shaft of the driven roller is rotatably and movably received in a groove formed in the pivotable member. An inlet opening of the groove for receiving the driven roller shaft is smaller than a diameter of the driven roller shaft and has elasticity.

The apparatus may further include a spring located on the opposite side with respect to the drive roller for pressing the driven roller shaft toward the drive roller. When the pivotable member pivots to cause the driven roller to leave the drive roller, the driven roller shaft may move in the groove and a clearance is created between the driven roller shaft and spring. The sheet inlet of the sheet path may be positioned above the sheet outlet, and an upper surface of the pivotable member may define part of the sheet path extending from the sheet inlet and a lower surface of the pivotable member may define part of the sheet path extending to the sheet discharge roller unit.

According to a fifth aspect of the present invention, there is provided an automatic sheet feed apparatus including lower, intermediate and upper frames to define a sheet path extending in a generally C shape when viewed laterally. The intermediate frame has a pivotable member that can be opened and closed and a guide member for guiding a sheet passing over a platen surface, and the pivotable member is a one piece element made from resin. The apparatus also includes a plurality of ribs formed on the sheet path and extending in a sheet feed direction near the sheet inlet and/or outlet. Therefore, the weight of the apparatus can be reduced and movement of the sheets in the sheet feed direction is facilitated.

BRIEF DESCRIPTION OF THE ACCOMPANYING DRAWINGS

DETAILED DESCRIPTION OF THE INVENTION

A preferred embodiment of the present invention will now be described in detail with reference to the accompanying drawings.

Figure 1:
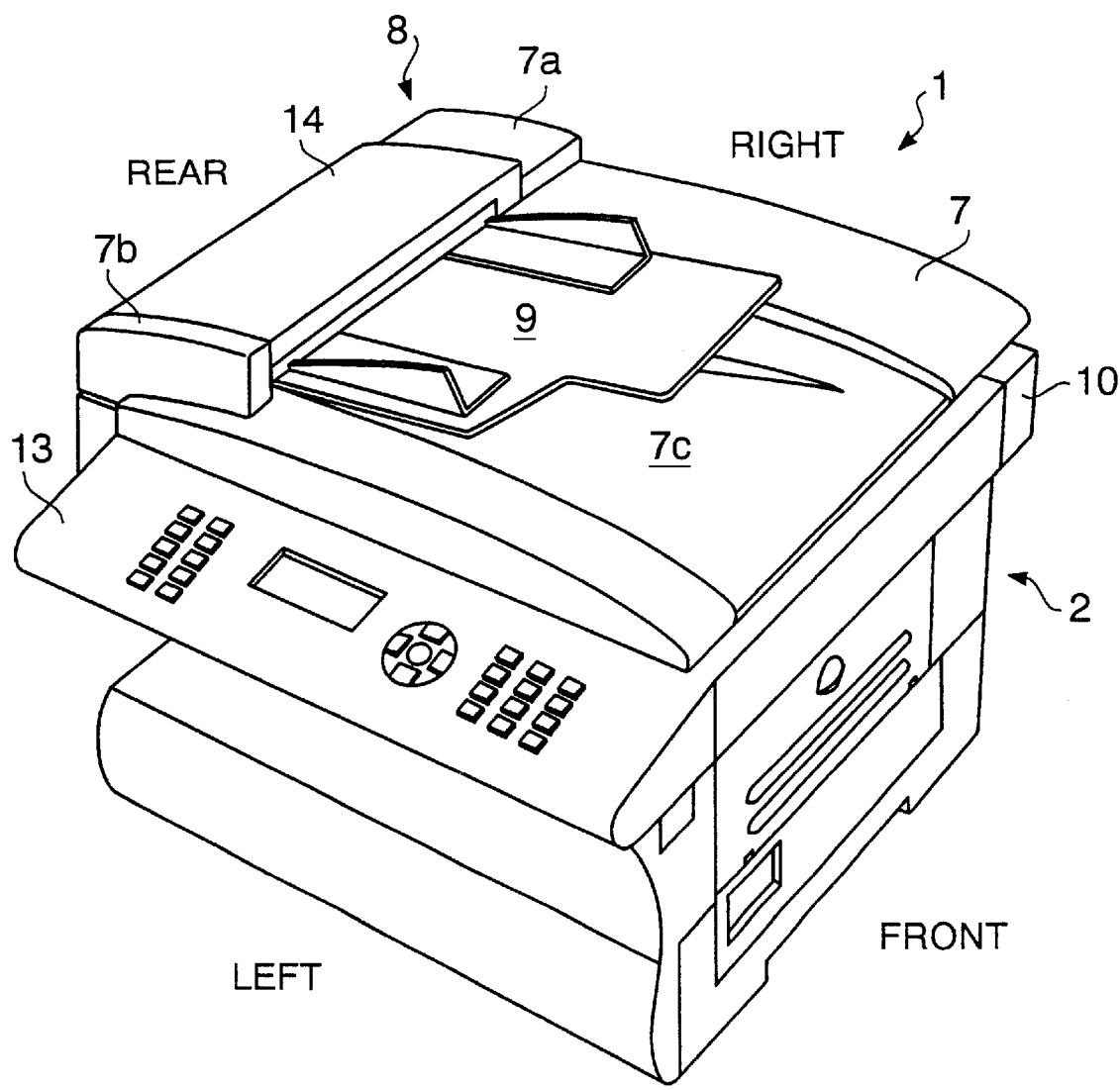
FIG. 1 illustrates a perspective view of a facsimile machine incorporating an automatic document feeder of the present invention.
Figure 2:
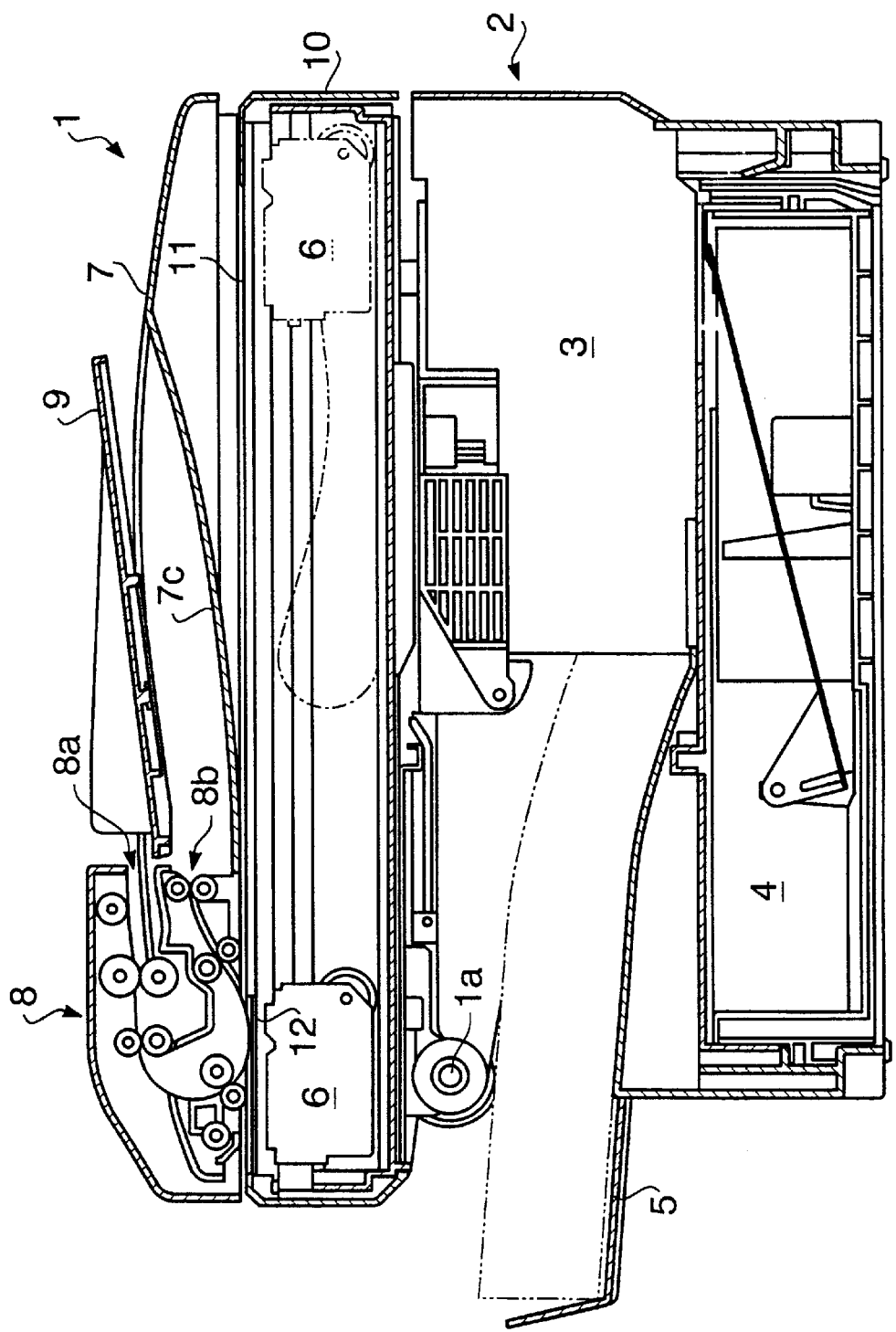
FIG. 2 illustrates a lateral sectional view of the facsimile machine shown in FIG. 1 when a scanning unit is closed (normal condition)
Figure 3:
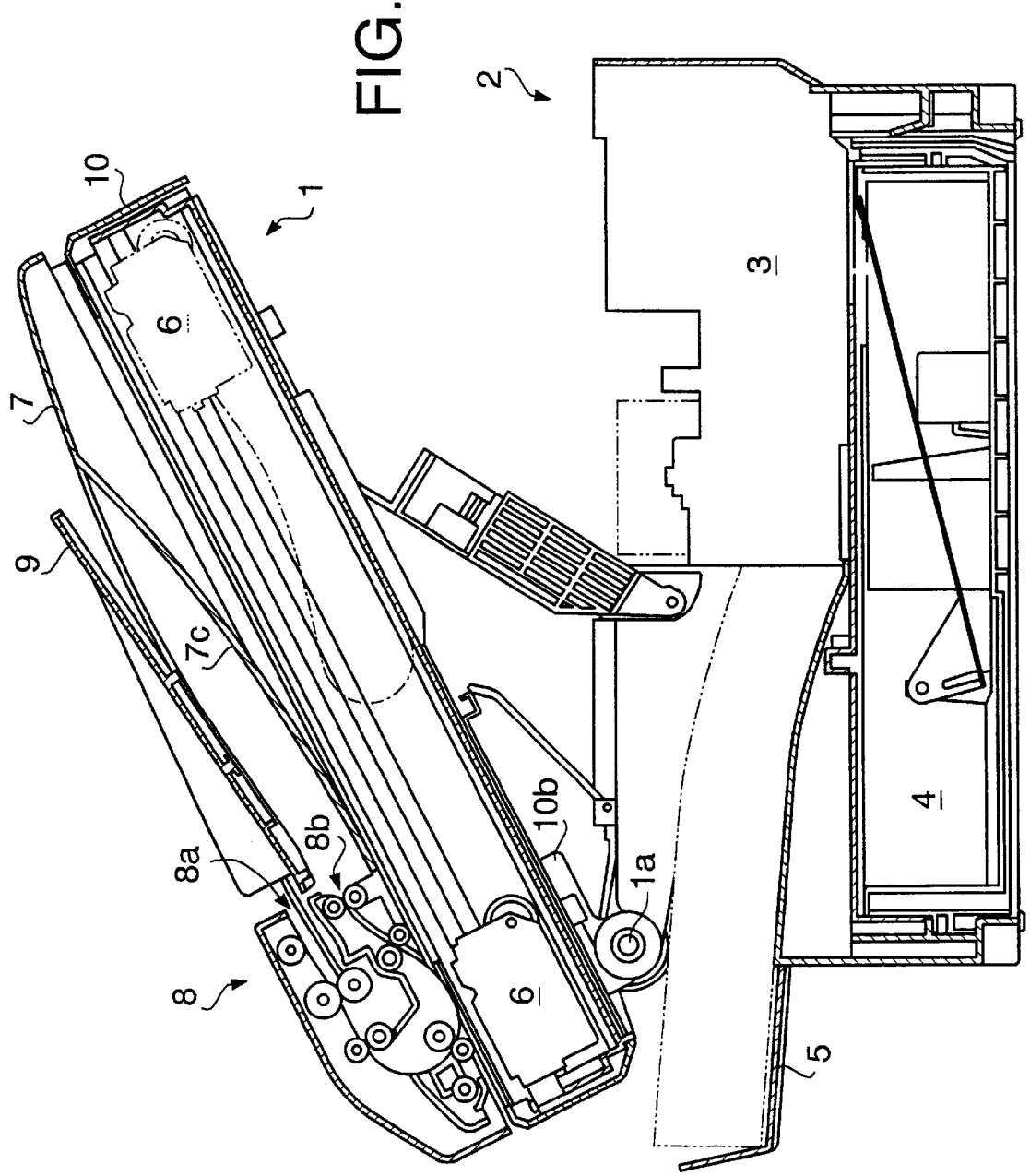
FIG. 3 is similar to FIG. 2 and illustrates another lateral sectional view of the facsimile machine when the scanning unit lifted from a recording unit.

Referring to FIGS. 1 to 3, illustrated is a facsimile machine F incorporating an automatic document feeder (ADF) of the present invention.

The facsimile machine F includes a recording unit 2 and a scanning unit 1 on the recording unit 2. The recording unit 2 includes a printer module 3 and paper feed cassette 4 below the printer module 3. Recording sheets stacked in the paper feed cassette 4 are fed to the printer module 3, and the sheets are discharged onto a tray 5 after the printing.

The scanning unit 1 has a casing 10 and a hinge 10b extending from a bottom of the casing 10. The hinge 10b is rotatably supported by a pin 1a located on the recording unit 2. Thus, the scanning unit 1 can pivot about the pin 1a upwards to a raised position and downwards to a lowered position relative to the recording unit 2. If the scanning unit 1 pivots upwards as illustrated in FIG. 3, the upper portion of the recording unit 2 is exposed so that a user can easily replace a toner and other parts/elements in the printer module 3 from the above.

A scanner 6 is located in the casing 10 of the scanning unit 1. A transparent stationary document bed 11 is laid to define an upper surface of the scanner casing 10. When a document is put on the transparent bed 11, the scanner 6 moves from its start position, indicated by the solid line in FIG. 2, to its end position, indicated by the imaginary line (from the left to the right in the drawing) to scan the document.

Over the scanner casing 10, laid is a resin-made document cover 7 to press a document on the document bed 11. The cover 7 is able to pivot about a shaft above the scanner casing 10.

An automatic document feeder (ADF) 8 is provided near the pivot shaft of the cover 7, and includes a paper feed portion and surrounding elements. As illustrated in FIG. 1, the ADF 8 is elongated in a direction perpendicular to the movement direction of the scanner 6. Side frames 7a and 7b of the cover 7 stand near ends of the ADF 8. Between these side frames 7a and 7b, placed is an ADF cover 14 for covering a paper feed portion of the ADF 8. Metallic plates (not shown) are associated with the side frames 7a and 7b such that they stand along the side frames in the vicinity of the ADF cover 14 to support shafts of drive rollers (will be described). One or both of the side frames 7a and 7b cover drive/power sources of the drive rollers and associated power transmission parts such as rollers and gears. The document cover 7 is integral with the side frames 7a and 7b and the metallic plates. The document cover 7, side frames 7a, 7b, metallic plates, drive roller power sources and power transmission parts are surrounding elements of the ADF 8. The paper feed portion of the ADF 8 is surrounded by these elements and concealed by the ADF cover 14.

A paper feed tray 9 is provided above the document cover 7 such that it is generally continuous to a paper inlet 8a of the ADF 8. Below the paper feed tray 9 and on the document cover 7, defined is a discharged paper tray 7c such that it is generally continuous to a paper outlet 8b of the ADF 8. The paper outlet 8b opens immediately below the paper inlet 8a. A generally "C" or turned "U" shaped paper path is defined in the ADF 8 from the paper inlet 8a to the paper outlet 8b as best understood from FIG. 2.

Figure 4:
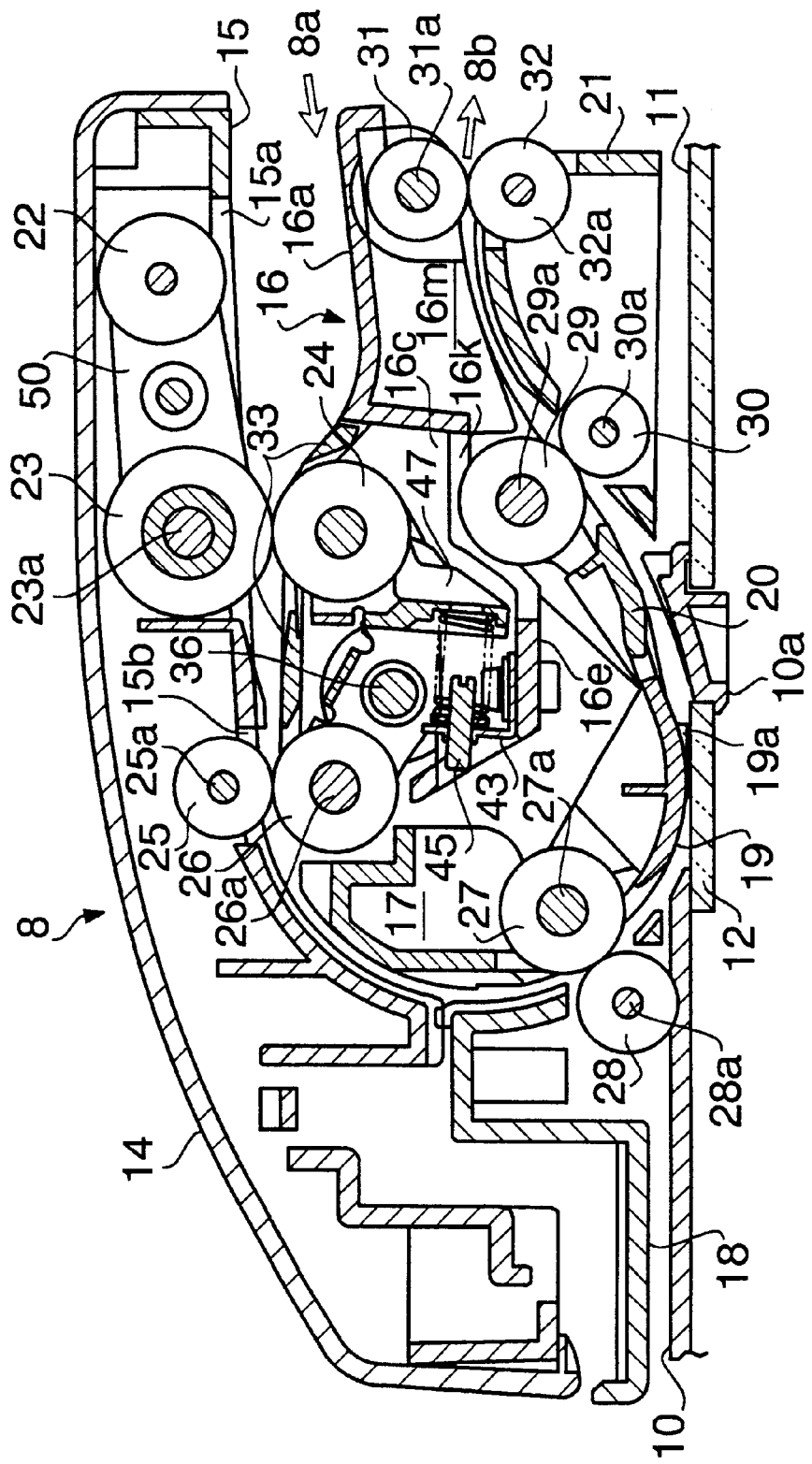
FIG. 4 illustrates a lateral cross sectional view of the automatic document feeder in a normal condition.
Figure 5:
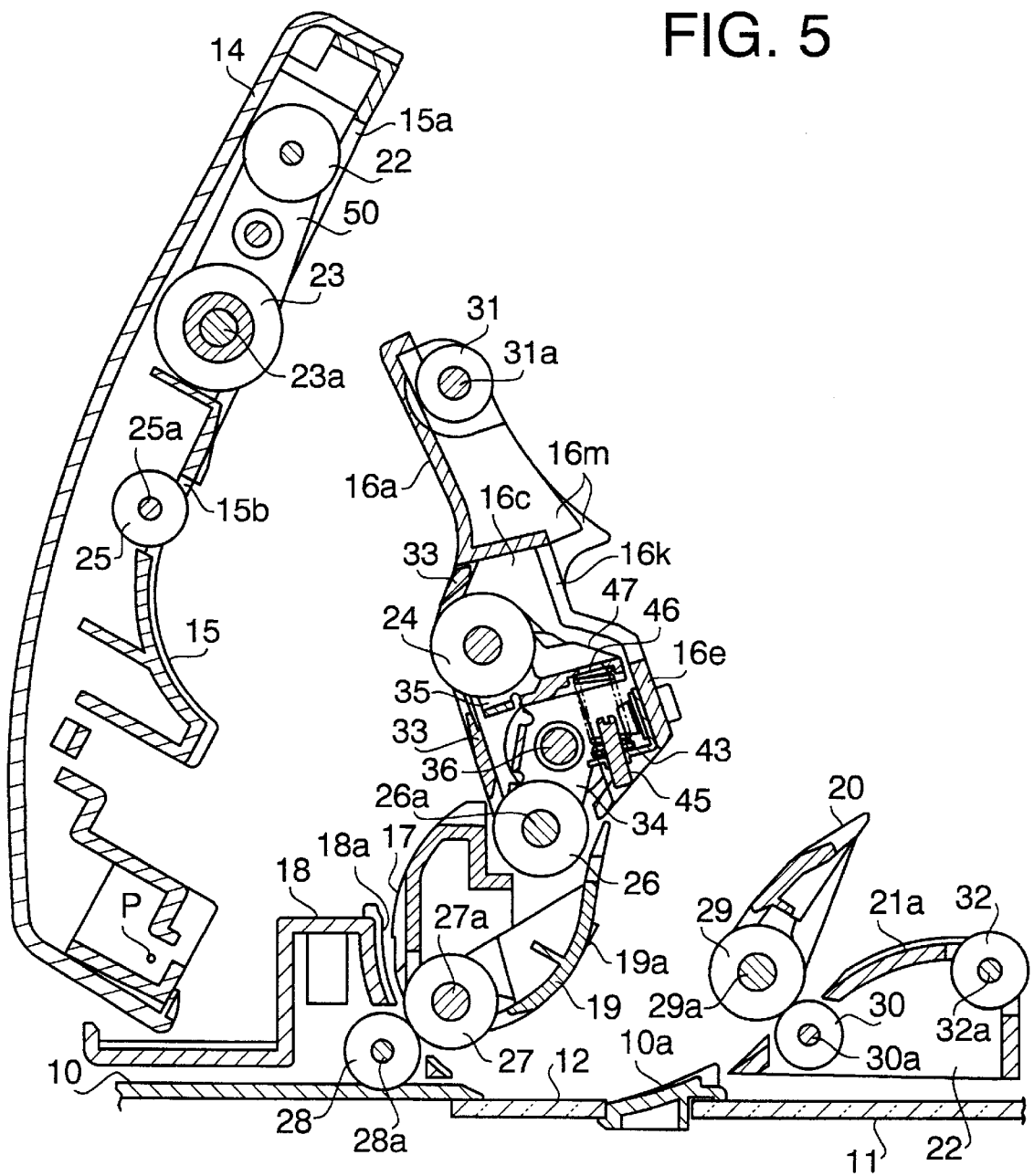
FIG. 5 illustrates a lateral sectional view of the automatic document feeder when a cover and associated frames are pivoted upwards.

Referring to FIGS. 4 and 5, when the document cover 7 is closed, a transparent platen glass 12 of the scanner casing 10 is positioned immediately below the ADF 8. The platen glass 12 is spaced (or offset) from the document bed 11 in this situation. A frame 10a is secured on the top of the scanner casing 10 such that it is positioned between the platen glass 12 and document bed 11. The upper surfaces of the platen glass 12 and the neighboring frame 10a guide and support the sheet moving in the paper path towards the paper outlet 8b.

Referring back to FIG. 2, a plurality of sheets stacked on the paper feed tray 9 are picked up one sheet by one sheet and delivered to the paper inlet 8a. The sheet passing over the platen glass 12 is scanned by the scanner 6 stopped at the initial position (indicated by the solid line). After the scanning, the sheet is transferred to the paper discharge tray 7c from the outlet 8b of the ADF 8.

In this manner, the scanning unit 1 can be used as a flat bed scanner that reads a stationary document with the moving scanner 6, and as a sheet feed type scanner that reads a moving document with the stationary scanner 6.

As depicted in FIG. 1, along one edge of the scanner casing 10, attached is a control panel 13. By selectively pressing one or more keys and buttons on the control panel 13, a user can cause the machine to scan a script and make a copy, or input a facsimile number of a recipient to send the scanned image via facsimile, or cause the printer 3 to print data, which is received from a remote party. The control panel 13 also includes a display. It should be noted that the control panel 13 may have a touch screen instead of the keys or buttons.

The inner structure of the ADF 8 will now be described in reference to FIGS. 4 to 14. It should be noted that the right side of the machine is referred to as "front," the left side is referred to as "rear," the control panel side is referred to as "left," and the opposite side is referred to as "right" in the following description as labeled in FIG. 1. Further, it should be assumed that unless otherwise mentioned, the following description deals with a situation like FIG. 4; the ADF cover 14 is closed, no document is present on the scanner bed 11, and the document cover 7 is placed over the scanner casing 10.

Referring to FIG. 4, a pick-up roller 22 is provided near the paper inlet 8a of the ADF 8, and a pair of discharge rollers 31 and 32 are provided at the paper outlet 8b. Along the C-shaped paper passage from the paper inlet 8a to the outlet 8b, arranged are a separate roller 23, a retard roller 24, first feed rollers 25 and 26, second feed rollers 27 and 28 and third feed rollers 29 and 30. Each two rollers make a pair, which are in contact with each other.

Rotation speeds of these rollers are not equal to each other. In particular, the first feed rollers 25 and 26 rotate faster than the separate roller 23 so that the sheets picked up from the paper tray 9 are successively transported at certain intervals.

Shafts 26a, 27a, 29a and 32a of the lower first feed roller 26, the upper second feed roller 27, the upper third feed roller 29 and the lower discharge roller 32 are supported by the side plates of the ADF 8 and their positions are fixed. These rollers are driven by the drive units mounted on one or both of the side frames 7a and 7b. Accordingly, the rollers 26, 27, 29 and 32 are drive rollers, and the mating rollers 25, 28, 30 and 31 are driven (or trailing) rollers.

It should be noted here that there is a possibility that a rear end of the sheet is still in touch with the lower discharge roller even after most of the sheet is discharged onto the discharge tray from the pair of paper discharge rollers. Conventionally, the upper paper discharge roller is the drive roller and the lower roller is the driven roller. The driven roller cannot exert a force sufficient to push the rear end of the sheet by its rotation so that the sheet rear end remains in contact with the lower driven roller. This hinders smooth discharge of a subsequent sheet. In the illustrated embodiment, therefore, the lower roller 32 is the drive roller and the upper roller is the driven roller.

Part of the lower surface of the document cover 7 is defined by a non-flat frame 18 located near the rear end of the ADF 8. This frame 18 forms an arcuate guide surface 18a (FIG. 5) at the beginning of the downstream half of the paper passage in the ADF 8, and rotatably supports the shaft 28a of the lower second feed roller 28. The outer guide surface 18a has a cutout portion to expose part of the lower second feed roller 28 so that the lower second feed roller 28 can contact the upper second feed roller 27.

Another part of the lower surface of the document cover 7 is defined by a frame 21 located below the paper outlet area. An upper portion of this frame 21 forms a lower guide surface 21a for the paper passage near the paper outlet 8b. The frame 21 also rotatably supports the shaft 30a of the lower third feed roller 30, and has a cutout in the guide surface 21a. The roller 30 is partly exposed from this cutout so that it can contact the upper feed roller 29. Further, the frame 21 rotatably supports the shaft 32a of the lower discharge roller 32, and has a cutout in the guide surface 21a near the paper outlet 8b. The roller 32 is partly exposed from this cutout so as to contact the upper paper discharge roller 31.

Between the frames 18 and 21, provided are a second guide member 19 and a third guide member 20 in turn in the direction of the paper movement toward the paper outlet 8b. The second guide member 19 is used for the scanning and the third guide member 20 is a bridge to the last frame 21. The second guide member 19 defines an upper guide for the sheet moving over the platen glass 12. In order to assure a certain clearance between the second guide member 19 and the platen glass 12 for passage of the sheet, pins 19a project downwards from the second guide member 19 at positions not obstructing the passage of the sheet. The pins 19a are in contact with the platen glass 12.

The second guide member 19 rotatably supports the shaft 27a of the upper second feed roller 27 near the first frame 18, and is pivotable about the shaft 27a. The second guide member 19 is biased downward in a normal condition. Therefore, the sheet discharged from the second feed rollers 27 and 28 is forced onto the platen glass 12 with an optimal pressing force. Accordingly, an appropriate scanning accuracy is ensured.

Figure 14:
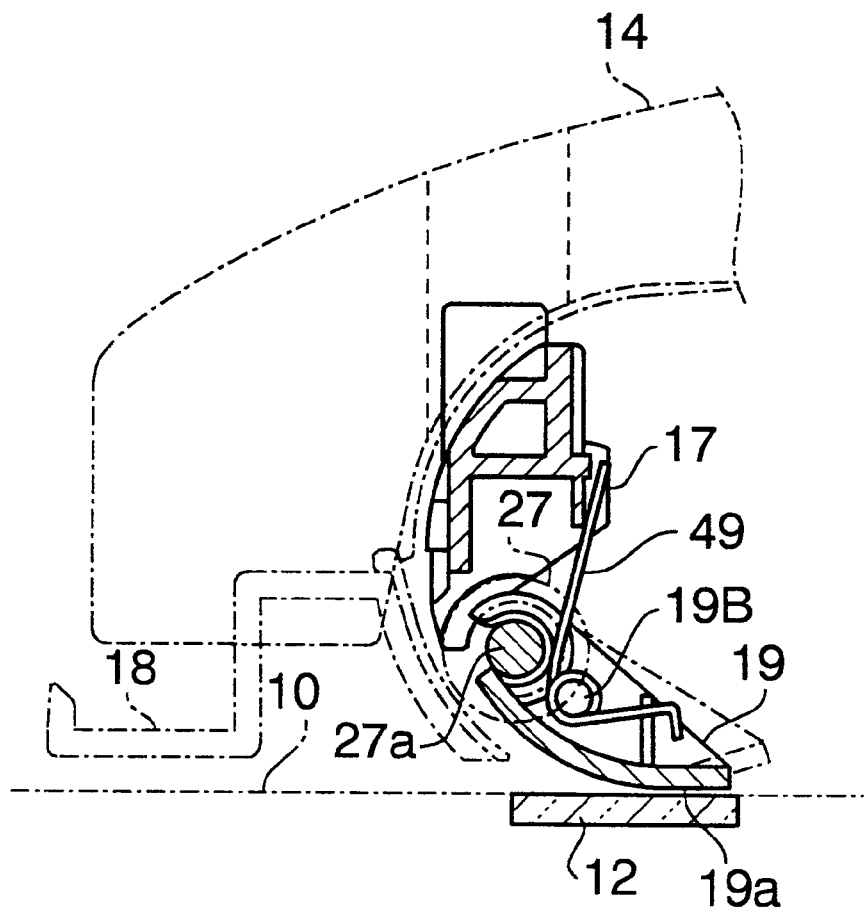
FIG. 14 illustrates a lateral cross sectional view of a biasing mechanism for a frame adapted to press a sheet on a platen glass.

Referring to FIG. 14, pins 19b project outwards from right and left ends of the second guide member 19, and torsion coil springs 49 are placed over these pins in order to apply a downward biasing force to the second guide member 19. One end of each spring 49 is elongated to hook on another frame 17 (will be described), and the other end is elongated to engage with the second guide member 19. In the lateral view, the two ends are biased in opposite directions. A downward restoration force exerted by the lower end serves as the downward biasing force on the second guide member 19.

As illustrated in FIG. 4, a lower surface of the third guide member 20 defines an upper guide surface for the sheet passing over the platen glass 12 and frame 10a to introduce the sheet to a nip between the third feed rollers 29 and 30. The third guide member 20 rotatably supports the shaft 29a of the upper third feed roller 29.

The third guide member 20 may be either fixed to the document cover 7 (its side frame 7a or 7b) or movable. In FIGS. 1 to 3, the third guide member 20 is fixed to the document cover 7, and in FIG. 5 the third guide member 20 is movable; it is pivotable upwards about the shaft 29a of the feed roller 29. In FIGS. 1 to 3, the ADF 8 is attached to the document cover 7. In FIG. 5, the ADF 8 is secured on the scanner casing 10 near the platen glass 12 and independent from the document cover 7. In FIG. 5, the second guide frame 19 is pivoted upwards against the downward biasing force and the third guide member 20 is pivoted upwards such that the upper surface of the platen glass 12 is exposed for cleaning.

As illustrated in FIG. 4, in the space between the lower first feed roller 26 and upper second feed roller 27, provided is an arcuate inner frame 17 of which lateral ends are supported by the machine frame. The inner frame 17 defines an inner guide surface of the turning portion of the sheet path.

Figure 6:
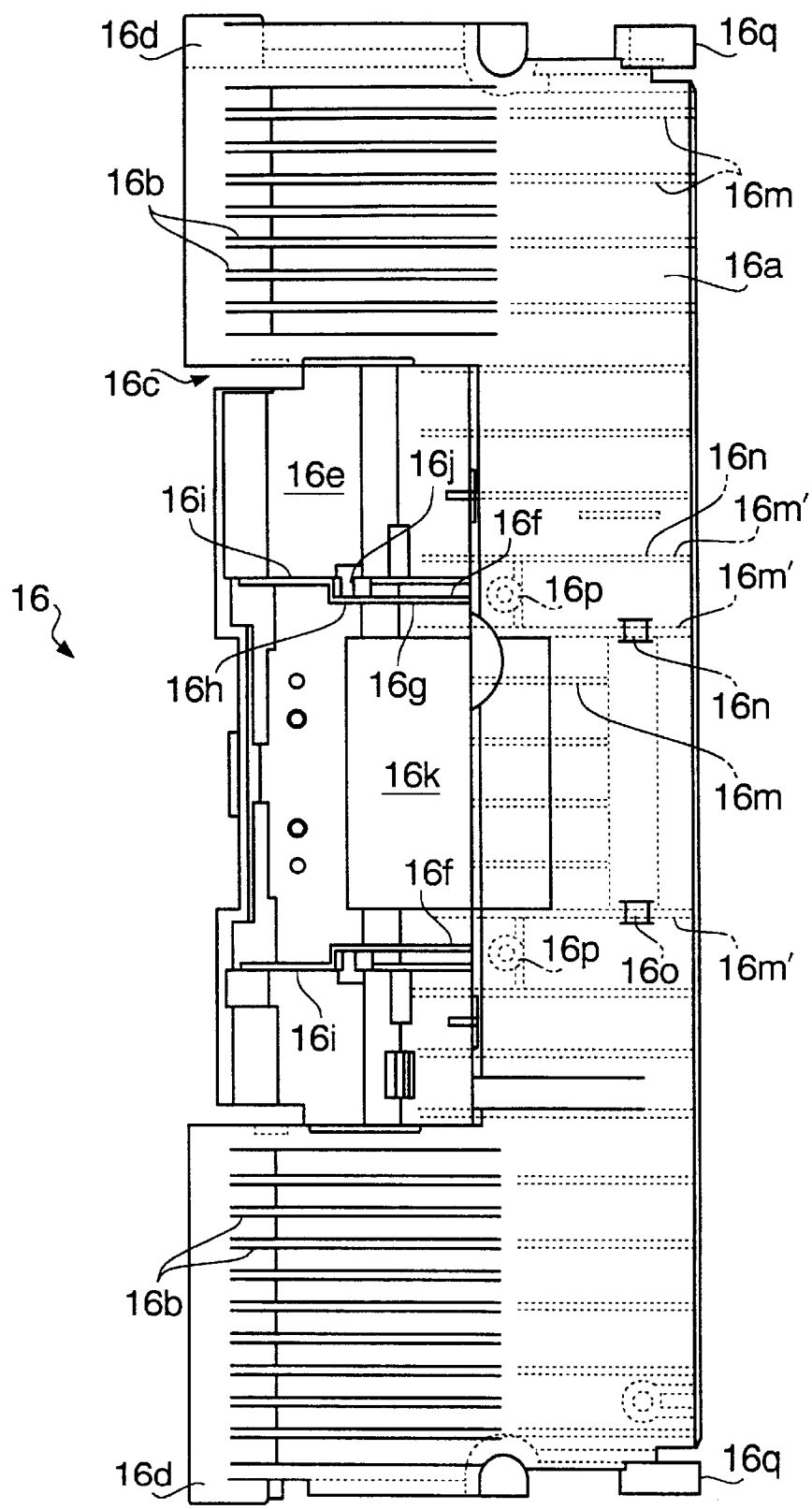
FIG. 6 illustrates a plain view of a document feed frame.
Figure 7:
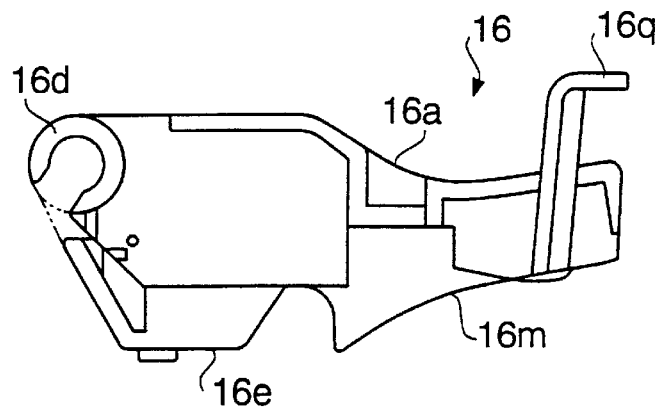
FIG. 7 illustrates a lateral view of the document feed frame shown in FIG. 6.

The sheet feed frame 16 (first guide member) is pivotable about the shaft 26a of the lower first feed roller 26 when the ADF cover 14 is pivoted upwards because as shown in FIGS. 6 and 7, a hinge portion 16d at the rear end of the sheet feed frame 16 is rotatably supported on the lower first feed roller shaft 26a. The sheet feed frame 16 is separate from the sheet cover 7. By pivoting the sheet feed frame 16 upwards, various parts and spaces otherwise concealed by this frame are exposed so that a user can fix paper jamming and/or replace the parts under the sheet feed frame 16. As shown in FIGS. 6 and 7, handles 16q stand from opposite lateral edges of the sheet feed frame 16 near its front end such that a user can grip these handles 16q and easily pivot the sheet feed frame 16 up and down.

As shown in FIGS. 4 and 7, an upper surface 16a of the sheet feed frame 16 extends from the sheet inlet 8a to a nip between the first feed rollers 25 and 26 As illustrated in FIG. 6, a rear half of the upper surface 16a of the sheet feed frame 16 (left half in the drawing) has a plurality of parallel ribs (projections) 16b extending in the sheet feed direction to facilitate movement of the sheet, and defines a lower sheet guide surface from a nip between the separate roller 23 and retard roller 24 to a nip between the first feed rollers 25 and 26.

Figure 10:
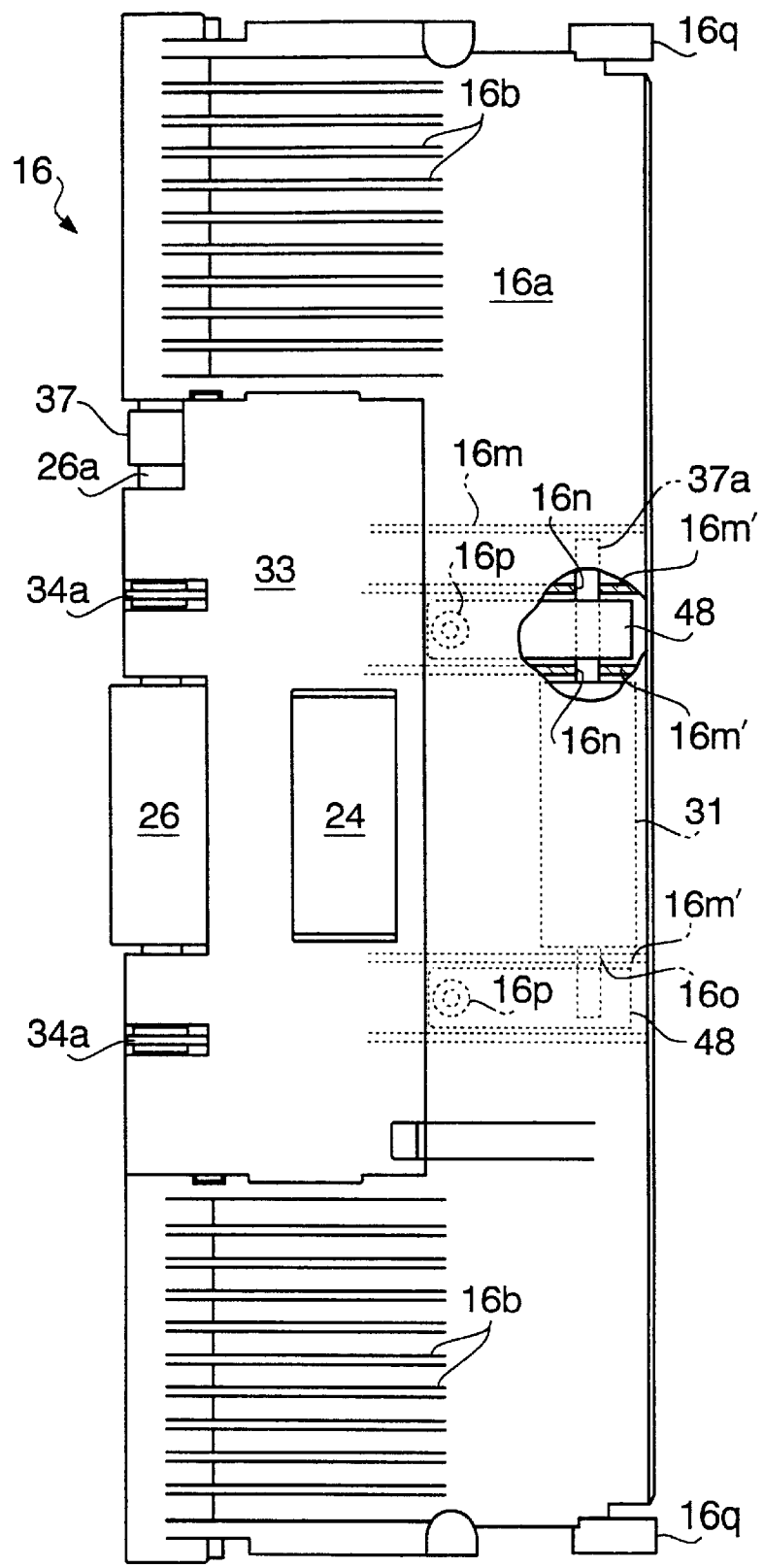
FIG. 10 is similar to FIG. 6 and illustrates another plan view of the document feed frame when sheet feed rollers are placed in a recess of the frame and a cover is put over the recess.

The rear half of the sheet feed frame 16 has a top-open recess 16c at its center to accommodate the retard roller 24, lower first feed roller 26, drives for these rollers and biasing mechanism for the retard roller 24. In a normal condition, a cover 33 with some cutouts closes the recess 16c as shown in FIGS. 4 and 10 such that the first feed roller 26 and retard roller 24 can partly be exposed. The cover 33 is coplanar to the adjacent cover surface 16a so that it defines part of the lower guide surface of the sheet path from the retard roller 24 to the first feed roller 26.

Figure 8:
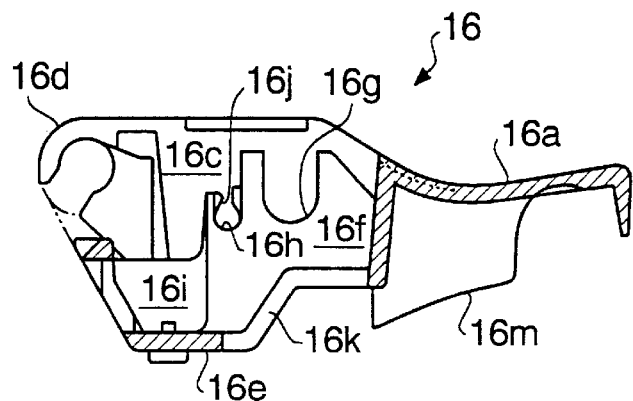
FIG. 8 is similar to FIG. 7 and illustrates a lateral cross sectional view of the document feed frame.

As illustrated in FIGS. 6 to 8, the recess 16c of the sheet feed frame 16 is defined by a bottom plate 16e of the frame. The bottom plate 16e supports a frame 43 for biasing the retard roller 24 (will be described). A cutout 16k is formed in the bottom plate 16e at its front portion to receive the upper third feed roller 29. The front half of the cover portion 16a (from the front edge of the frame 16 to the proximity of the cutout 16k) has a plurality of parallel ribs (projections) 16m extending in the sheet feed direction on its lower surface to facilitate movement of the sheet in the sheet path. Each rib 16m extends also vertically downwards. These ribs 16m define an upper guide surface of the sheet path from a nip between the two third feed rollers 29 and 30 and a nip between the two sheet discharge rollers 31 and 32.

The sheet feed frame 16 is made from resin, and integrally has the upper cover portion 16a and associated ribs 16b that define the sheet guide from the sheet inlet 8a to the first feed rollers 25 and 26, and another ribs 16m that define the sheet guide from the third feed rollers 29 and 30 to the paper outlet 8b. Conventionally, on the other hand, the sheet guide member from the sheet inlet 8a to the first feed rollers 25 and 26, which is made from resin or steel, is separated from the sheet guide member from the third feed rollers 29 and 30 to the paper outlet 8b, which is also made from resin or steel, and these sheet guide members are manufactured separately and assembled later. In the illustrated embodiment, these members are integrally formed so that the assembling process is unnecessary and parts to the assembling are dispensed with. This contributes to weight reduction as well as cost reduction.

Figure 9:
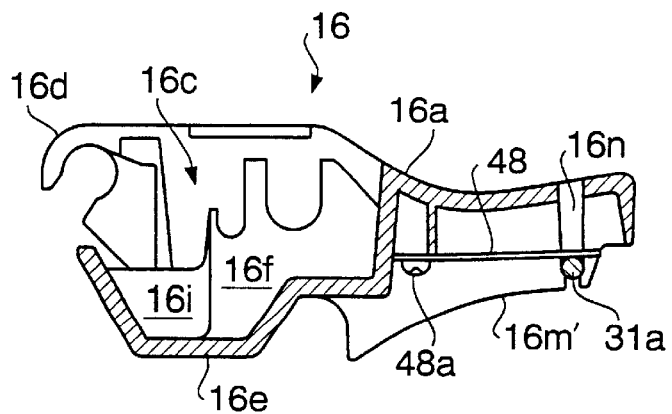
FIG. 9 is similar to FIG. 8 and particularly illustrates a shaft support for a paper discharge roller shaft.

It should be noted that the ribs 16m may include modified ribs as illustrated in FIGS. 6, 9 and 10. Specifically, there may be provided modified ribs 16m' that support the shaft 31a of the paper discharge roller 31. In the illustrated embodiment, there are two modified ribs 16m' on the right side of the paper discharge roller 31 and one on the left side.

Each of the discharge roller support ribs 16m' has a slot or oval hole extending vertically such that it can receive the associated roller shaft end vertically. Specifically, the left rib 16m' has an elongated hole 16o and the right ribs 16m' have two slots 16n. Each slot 16n has a reduced opening at its lower end, which is smaller than a diameter of the roller shaft 31a. It should be noted that the right ribs 16m' may have the elongated hole 16o and the left rib may have the slots 16n. FIG. 9 only illustrates the ribs 16m' having the slots 16n.

In order to support the roller shaft 31a, one end of the roller shaft 31a is inserted into the elongated hole 16o and the other end of the roller shaft 31a is squeezed into the slots 16n. In this case, normally, the sheet feed frame 16 is pivoted upwards as illustrated in FIG. 5, and the ends of the roller shaft 31a are fitted into the elongated hole and slots of the ribs 16m' from the front side of the machine. The ribs 16m' are made from the resin and therefore have elasticity so that it is possible to push the roller shaft end into the slots 16n through the reduced inlet openings. The reduced opening of each slot 16n deforms during squeezing of the roller shaft end, and returns to the original shape after the squeezing so that the roller shaft 31a will not drop from the slot 16n.

As illustrated in FIGS. 9 and 10, a leaf spring 48 is provided between the two ribs 16m' having the slots 16n and another leaf spring 48 is provided between the rib 16m' having the elongated hole 16o and an adjacent rib 16m. Each of the leaf springs 48 is secured on the lower face of the upper cover member 16a at its rear end by a screw 48a that is engaged into a female thread 16p (FIG. 6) formed in the cover member 16a. The front end of each leaf spring 48 extends over the roller shaft 31a. If the sheet feed frame 16 is pivoted slightly upwards about the roller shaft 26a, the roller shaft 31a remains on the lower ends of the slots 16n and elongated hole 16o and there is created a small clearance between the roller shaft 31a and the leaf springs 48. When the sheet feed frame 16 is returned to the normal position, the upper paper discharge roller 31 contacts the lower paper discharge roller 32 and is pushed upwards. As a result, the roller shaft 31a is caused to move upwards in the slots 16n and elongated hole 16o and abuts the leaf springs 48. Then, the leaf springs 48 exert the downward biasing force on the upper paper discharge roller 31, which pushes the upper paper discharge roller 31 against the lower paper discharge roller 32. This results in a nipping force between the rollers 31 and 32.

Figure 11:
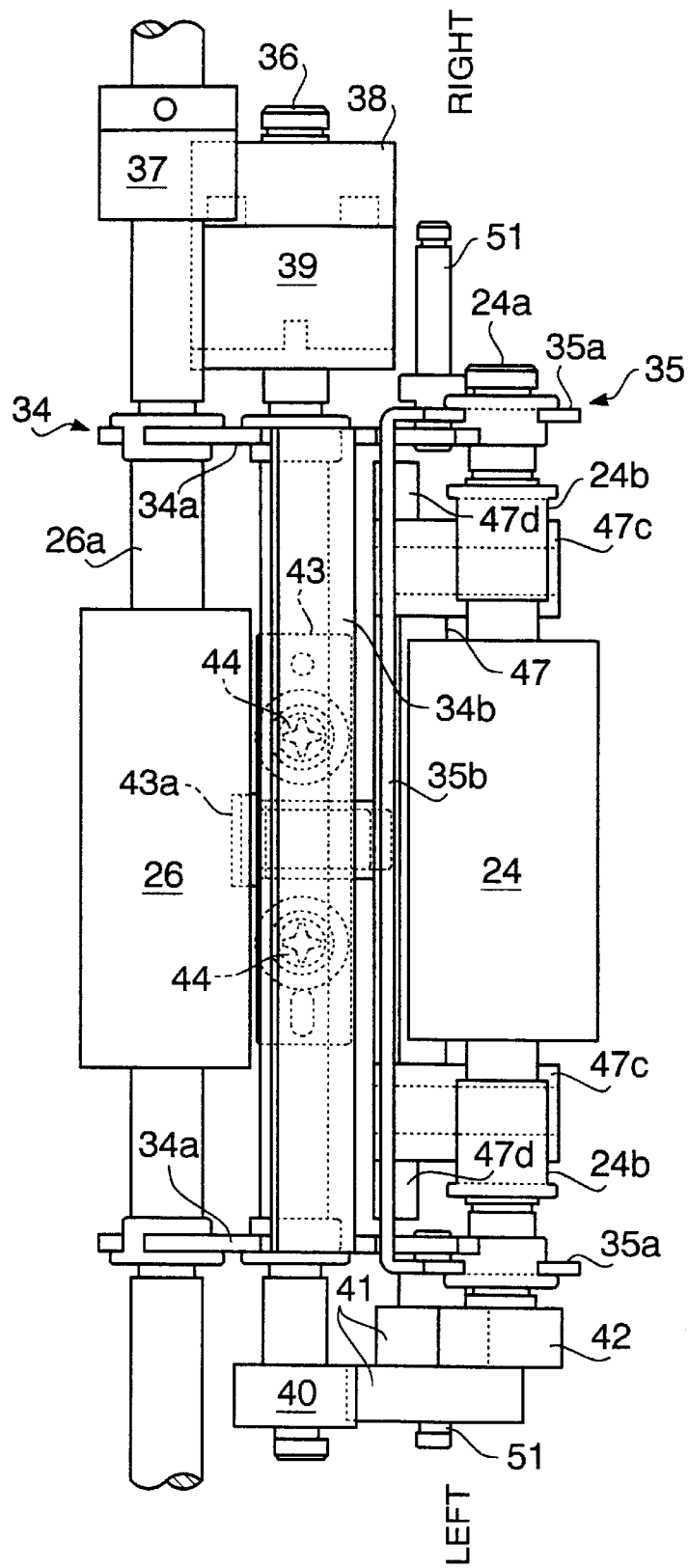
FIG. 11 illustrates retard roller and lower first feed roller together with their support structures, drive mechanisms and biasing mechanism received in the recess of the frame when viewed from the top.
Figure 12:
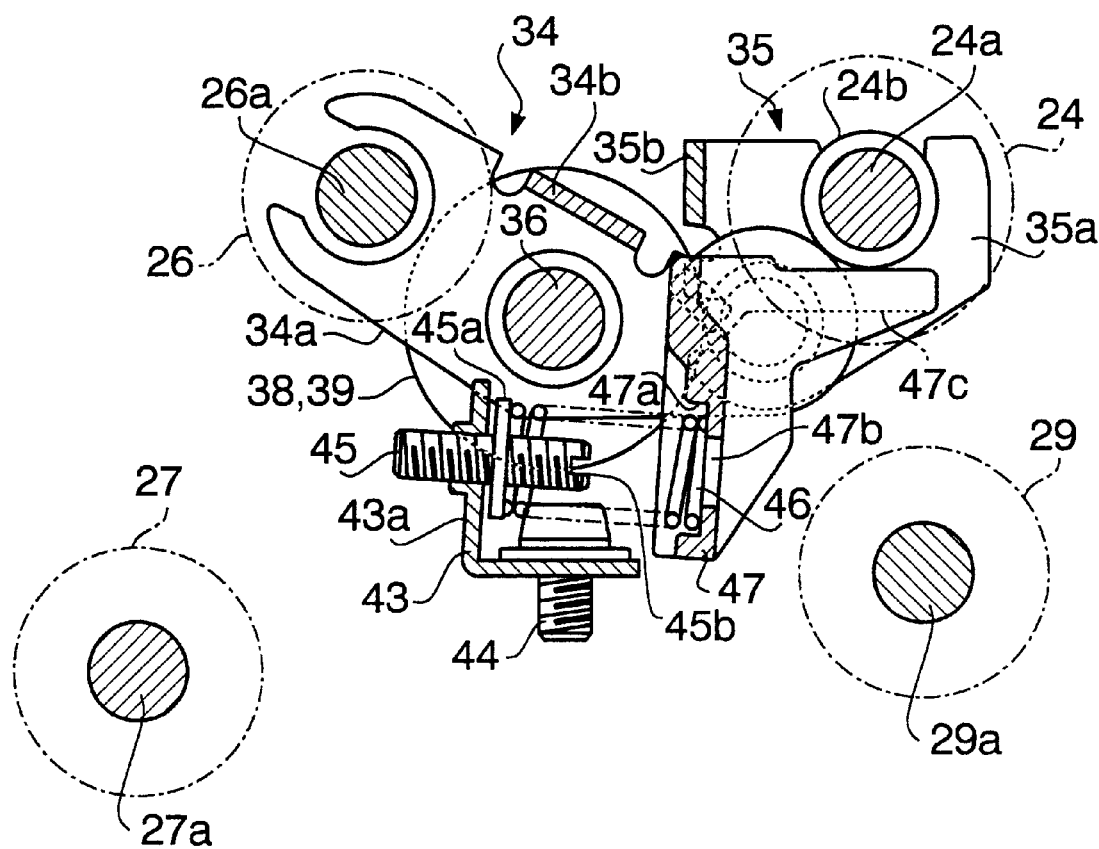
FIG. 12 illustrates a lateral cross sectional view of the rollers and associated parts shown in FIG. 11 in the normal condition.
Figure 13:
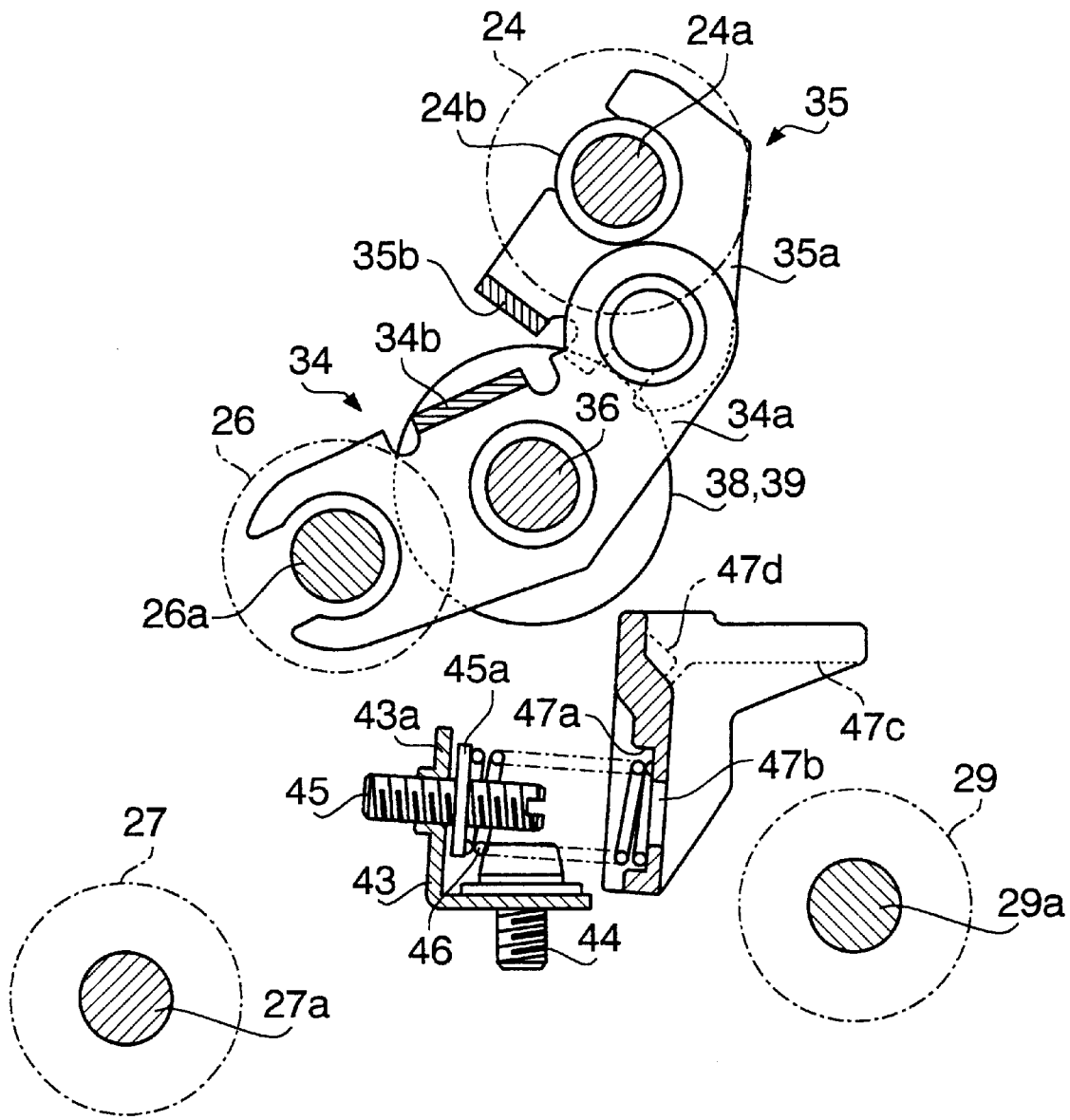
FIG. 13 illustrates the rollers and associated parts when the retard roller is pivoted upwards by arms.

Referring to FIGS. 11 to 13, a drive mechanism for the lower first feed roller 26 and retard roller 24 located in the sheet feed frame 16 will be described. As already mentioned, both ends of the shaft 26a of the first feed roller 26 are supported by the lateral plates of the machine, and rotated by drive mechanisms attached to one or both of the side frames 7a and 7b. A drive mechanism for the retard roller 24 is a mechanism that transfers the rotations of the first feed roller 26 to the retard roller 24.

Inside the recess 16c of the sheet feed frame 16, provided is a first arm 34 to sustain the first feed roller 26. The first arm 34 includes a pair of vertically standing shaft supports 34a at its right and left ends and a connecting element 34b extending between the shaft supports. The first arm 34 is made from a single metallic or resin plate by bending. The ends of the shaft 26a of the first feed roller 26 penetrate the two shaft supports 34a and are rotatably supported.

Inside the recess 16c, also provided is a second arm 35 to support the retard roller 24. The second arm 35 is supported at the front end of the first arm 34. The second arm 35 includes a pair of right and left erect shaft supports 35a and a connecting element 35b bridging the shaft supports. Like the first arm 34, the second arm 35 is made from a single metallic or resin plate by bending. The ends of the retard roller shaft 24a penetrate the associated shaft supports 35a and are supported rotatably. As best seen in FIG. 11, the shaft supports 35a are supported by the shaft supports 34a with pins 51 at the front end of the shaft supports 34a.

In this manner, the first arm 34 is pivotable up and down relative to the roller shaft 26a and the second arm 35 is pivotable up and down relative to the first arm 34. These arms are normally biased downwards by the separate roller 23 and take positions shown in FIG. 12. Thus, the rollers 24 and 26 are housed in the recess 16c. When maintenance is needed, the ADF cover 14 is pivoted upwards, the cover 33 is removed, and the first and second arms 34 and 35 are pivoted upwards as shown in FIG. 13 so that a user/operator can lift up the retard roller 24 and associated drive mechanism from the sheet feed frame 16. By removing the second arm 35 from the pins 51, it is possible to take out the retard roller 24 and second arm 35 only.

As shown in FIG. 11, when viewed from the top, an intermediate shaft 36 extends parallel between the retard roller 24 and feed roller 26 inside the recess 16c of the sheet feed frame 16 and penetrates the end plates 34a of the first arm 34 such that it is rotatably supported by these end plates 34a. On the right end of the feed roller shaft 26a outside the first arm 34, secured is a first gear 37 for transferring the rotations of the feed roller 26 to the retard roller 24. On the right end of the intermediate shaft 36 near the first gear 37, provided are a torque limiter 39 and a second gear 38 in mesh with the first gear 37. Therefore, the rotations of the feed roller shaft 26a are transferred to the intermediate shaft 36 via the gears 37 and 38 and the torque limiter 39. If a torque greater than a predetermined value acts on the retard roller 24, the torque limiter 39 functions to interrupt the transfer of the rotations to the intermediate shaft 36 from the roller shaft 26a. It should be noted that the first and second gears 37, 38 and associated torque limiter 39 may be provided on the left side of the first arm 34.

A third gear 40 is secured on the left end of the intermediate shaft 36. A fourth gear 41 is rotatably supported on the left pin 51 and meshes with the third gear 40. A final gear 42 is fixed on the left end of the shaft 24a of the retard roller 24 and meshes with the fourth gear 41.

In this manner, a gear train from the feed roller shaft 26a to the retard roller shaft 24a includes the right side train (first gear 37, second gear 38 and torque limiter 39) and left side train (third gear 40, fourth gear 41 and final gear 42) via the intermediate shaft 36. Conventionally, the gear train from the feed roller to the retard roller includes only one train; all the gears are located on right or left side of the first and second arms 34 and 35. Such arrangement, however, tends to generate a stress unilaterally concentrated on the one side of the arms 34 and 35. This prohibits the sheet from moving straight along the sheet path. To avoid this in the present embodiment, the intermediate shaft 36 is provided between the two roller shafts 26a and 24a to divide the gear train into two branches. A stress exerted on the retard roller 24 upon transferring of the rotation is therefore equalized on the right and left sides. Consequently, the sheet does not deviated from the sheet path, but proceeds straight.

It should be noted that the only role of the torque limiter 39 is not to transfer the drive power to the retard roller 24 from the roller shaft 26a when a torque more than a predetermined value acts on the retard roller 24. Therefore, the location of the torque limiter 39 is not limited to between the second gear 38 and intermediate shaft 36. For example, it may be provided between the first gear 37 and feed roller shaft 26a, between the third gear 40 and intermediate shaft 36, between the final gear 42 and retard roller shaft 24a, or between the fourth gear 41 and pin 51.

The retard roller 24 is caused to rotate in a direction opposite to the sheet feeding direction. The separate roller 23 in contact with the retard roller 24, on the other hand, is caused to rotate in the sheet feeding direction. A drive mechanism for the separate roller 23 is located under the ADF cover 14. When there is no sheet between the retard roller 24 and separate roller 23, a friction generated between these rollers 23 and 24 activates the torque limiter 39 so that the drive power from the final gear 42 is not transferred to the retard roller 24. Accordingly, the retard roller 24 rotates together with the separate roller 23 in the sheet feeding direction. The pick-up roller 22 takes up an uppermost sheet from a plurality of the sheets stacked on the sheet tray 9, and carries it to the nip between the separate roller 23 and retard roller 24. A friction between the separate roller 23 and sheet causes the torque limiter 39 make a lost motion, and in turn causes the retard roller 24 to rotate in a sheet feed direction (opposite the drive direction of the retard roller 24), thereby transferring the sheet to the downstream. If two or more sheets are accidentally squeezed into the nip, a friction between the sheets is smaller than that between the retard roller 24 and sheet so that the load on the retard roller 24 is weakened and a clutch of the torque limiter 39 is engaged. As a result, the retard roller 24 is caused to rotate in the direction opposite the sheet feeding direction, and push back the sheets other than the top sheet to the paper inlet 8a. In this manner, the uppermost sheet is only allowed to proceed forwards, i.e., toward the nip between the first feed rollers 25 and 26.

Now, a biasing mechanism for the retard roller 24 will be described in reference to FIGS. 11 to 13. The retard roller 24 is located below the separate roller 23 and biased upwards to push the separate roller 23. Conventionally, the retard roller is provided with a biasing member extending vertically such as a spring. In the conventional arrangement, when the biasing force should be adjusted and/or the spring should be replaced, the retard roller and associated frame should be rotated about 90 degrees in order to direct the biasing member horizontally toward the front because a user can only access the spring from the front. In the present embodiment, contrarily, the sheet feed frame 16 is not required to move from the normal position at all, or only required to move slightly upwards as long as the ADF cover 14 is pivoted upwards when a user needs to adjust the biasing force of the spring and/or replace the spring from the front of the machine.

An L-shaped frame 43 is secured on the bottom plate 16e of the sheet feed frame 16 by screws 44, and upright portion 43a of this frame 43 has a female thread extending generally in the sheet feed direction. A screw 45 for adjusting the biasing force is threaded into this female thread, with its head being directed to the front of the machine (to the right in FIG. 12). A turned L-shaped arm 47 made from a material easy to machine, cut and bend such as resin is provided in front of the screw 45. A shoulder portion or concave 47a for receiving a spring is formed in the center of the upright portion of the arm 47. A compression spring 46 extending generally in the sheet feed direction is placed between a flange 45a of the screw 45 immediately before the vertical portion 43a of the frame 43 and the spring receiving concave 47a of the arm 47.

The arm 47 has a through hole 47b communicating with the spring receiving concave 47a. The through hole 47b generally extends in the sheet feed direction. Since the cutout 16k for receiving the upper third feed roller 29 is present in front of the through hole 47b, normally the through hole 47b is concealed by the roller 29 if viewed from the front. However, if the ADF cover 14 is opened and the sheet feed frame 16 is slightly pivoted upwards about the roller shaft 26a, the through hole 47b is positioned above the roller 29. A user is then able to insert a screw driver into a groove 45b in the front head of the screw 45 through the hole 47b from the front of the machine in the sheet feeding direction. By rotating the screw 45, it is possible to adjust the compression of the spring 46 thereby adjusting the biasing force applied onto the retard roller 24 (more detail will be described below).

A pair of right and left push arms 47c extend toward the front of the machine generally horizontally from an upper front edge of the arm 47. A pair of slide rollers 24b are provided on the retard roller shaft 24a on the right and left sides of the retard roller 24 within the confine of the second arm 35 (between the shaft supports 35a). These slide rollers 24b ride on the push arms 47c such that they can slide and rotate thereon.

As illustrated in FIGS. 6 to 9, a pair of right and left inner support ribs 16f stand from the bottom plate 16e in the recess 16c of the sheet feed frame 16. Each rib 16f has a top-open groove 16g to support an end of the roller shaft 24a immediately outside the associated slide roller 24b. The roller shaft 24a can move up and down within the confine of the grooves 16g of the ribs 16f since the second arm 35 is supported at the front end of the first arm 34.

Each rib 16f also has another top-open groove 16h at the rear of the groove 16g to support the bias arm. A pair of light and left outer ribs 16i are provided near and outside the inner ribs 16f. The outer ribs 16i are generally in parallel to the inner ribs 16f, and partly overlap the inner ribs 16f if viewed laterally. Each outer rib 16i has a hole 16j at a position corresponding to the groove 16h of the associated inner rib 16f. A pair of hinge pins 47d project laterally outwards from the upper right and left ends of the bias arm 47. The hinge pins 47d are inserted in the grooves 16h and holes 16j so that the bias arm 47 can pivot up and down about the hinge pins 47d.

Accordingly, the lower portion of the bias arm 47 is pushed toward the front by the bias spring 46, and the push arms 47c of the bias arm 47 are pivoted upwards thereby raising the roller shaft 24a. Consequently, the retard roller 24 is biased upwards and pressed against the separate roller 23, which is positioned immediately above the retard roller 24. By adjusting the compression of the bias spring 46, it is possible to adjust the biasing force to be applied on the retard roller and obtain a desired pressure against the separate roller 23.

Next, the inner structure of the ADF cover 14 will be described. As illustrated in FIGS. 4 and 5, the bottom of the ADF cover 15 is closed by a bottom plate 15 which defines an upper guide surface of the sheet path from the paper inlet 8a to the turning portion of the sheet path. The lower cover 15 has cutouts 15a and 15b. The cutout 15a is used to receive a sheet feed arm 50 that supports the pick-up roller 22 and separate roller 23. The other cutout 15b receives the upper feed roller 25.

The sheet feed arm 50 also supports a gear mechanism to transmit the drive power from the separate roller 23 to the pick-up roller 22. The separate roller shaft 23a is rotatable relative to the ADF cover 14 (or its lower cover 15), and the sheet feed arm 50 can pivot up and down about the roller shaft 23a. As the roller shaft 23a rotates, the other end of the sheet feed arm 50 that supports the pick-up roller 22 pivots downwards. Thus, the pick-up roller 22 reaches the uppermost sheet among those stacked in the paper tray 9, and rotates to feed the uppermost sheet to the nip between the separate roller 23 and retard roller 24.

The ADF cover 14 (integral with the lower cover 15) is pivotable about a point P (FIG. 5). When the ADF cover 14 is closed, the separate roller 23 contacts the retard roller 24, and the upper first feed roller 25 contacts the lower first feed roller 26. If the maintenance is needed or the paper jamming should be eliminated, the ADF cover 14 is pivoted upwards about the pivot center P to expose the interior of the ADF cover 14 Further, when the ADF cover 14 is raised as shown in FIG. 5, the sheet feed frame 16 can pivot upwards about the roller shaft 26a, the second guide member 19 can pivot upwards about the roller shaft 27a against the biasing force of the torsion coil spring 49, and the third guide member 20 can pivot upwards about the roller shaft 28a. Consequently, the sheet path is exposed and a user can access to the machine's inside to fix the jamming and repair the rollers, gears, platen glass 12 and other parts.

In the illustrated embodiment, at least the sheet feed frame 16 is made from resin, and the upper and lower ribs 16b and 16m for the sheet feeding and the inner and outer ribs 16f and 16i for the retard roller 24 and bias arm 47 are formed integrally. Further, the cover and frame members for the ADF 8 such as ADF cover 14, bottom plate 15, inner frame 17, outer frame 18, guide frame 19, intermediate frame 20 and lower frame 21 are also made from the resin, and they are integral with the ribs 16b and 16m to define their sheet guide surfaces. Accordingly, the manufacturing, machining and assembling of the ADF 8 is simplified, and the weight and cost of the ADF 8 are also reduced.

According to the present invention, the installation and removal of the retard roller becomes easier so that the replacing and maintenance of the retard roller is facilitated. Further, the adjustment of the biasing force of the retard roller is facilitated since a user/operator can access the adjusting element horizontally.

What is claimed is:

1. An automatic sheet feed apparatus having a sheet inlet and a sheet outlet, comprising:

a lower frame, an intermediate frame and an upper flame to in combination define a sheet path extending from a sheet inlet to a sheet outlet, the sheet path being generally shaped like C when viewed laterally, the intermediate frame having at least a pivotable member that can be opened and closed, and a guide member for guiding a sheet passing over a platen surface;

a sheet discharge roller unit located at the sheet outlet and including a drive roller supported by the lower frame and a driven roller supported by the pivotable member such that the driven roller faces the drive roller and a shaft of the driven roller is rotatably and movably received in a groove formed in the pivotable member, an inlet opening of the groove for receiving the driven roller shaft being smaller than a diameter of the driven roller shaft and having elasticity; and a spring located on the opposite side with respect to the drive roller for pressing the driven roller shaft toward the driver roller, and wherein when the pivotable member pivots to cause the driven roller to leave the drive roller, the driven roller shaft moves in the groove and a clearance is created between the driven roller shaft and spring.

2. The automatic sheet feed apparatus as recited in claim 1, wherein the sheet inlet of the sheet path is positioned above the sheet outlet, and an upper surface of the pivotable member defines part of the sheet path extending from the sheet inlet and a lower surface of the pivotable member defines part of the sheet path extending to the sheet discharge roller unit.

* * * * *